United States Patent

Connell et al.

Patent Number: 5,940,447
Date of Patent: *Aug. 17, 1999

[54] WIRELESS POWERED COMMUNICATION DEVICE USING POWER SIGNAL SAMPLING AND METHOD

[75] Inventors: Lawrence E. Connell, Naperville; Neal W. Hollenbeck, Orland Park; Kenneth A. Paitl, East Dundee, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/706,064

[22] Filed: Aug. 30, 1996

[51] Int. Cl.$^6$ ........................................... H03D 1/24
[52] U.S. Cl. ........................... 375/316; 375/320; 455/41; 379/55.1; 235/379; 235/380
[58] Field of Search ........................ 375/316, 320; 455/41; 381/79; 340/825.54; 235/379, 380, 441, 449, 486, 487, 492; 379/55.1

[56] References Cited

U.S. PATENT DOCUMENTS

| 4,605,844 | 8/1986 | Haggan | 235/380 |
|---|---|---|---|
| 4,827,111 | 5/1989 | Kondo | 375/316 |
| 4,906,828 | 3/1990 | Halpern | 235/492 |
| 5,069,210 | 12/1991 | Jeutter et al. | 455/41 |
| 5,309,482 | 5/1994 | Wright et al. | 375/350 |
| 5,434,396 | 7/1995 | Owen et al. | 235/449 |
| 5,652,768 | 7/1997 | Ritter et al. | 375/316 |

*Primary Examiner*—Don N. Vo
*Attorney, Agent, or Firm*—Wayne J. Egan

[57] ABSTRACT

A circuit (34) for data recovery in a wireless powered communication device (10) obviates the need for the costly high power consumption filters of prior art devices by deriving a clock signal from the power coil (18), and then sampling the data coil (20) signal with the derived sampling clock. The step of deriving a clock signal from the power signal causes the component of the power signal present on the data signal to be aliased to DC which is then easily rejected with a low order high pass or bandpass filter (38). Furthermore, the data signal may be amplified to a desired level suitable for amplitude discrimination by a simple comparator circuit (40) with hysteresis. Demodulation of the data signal is easily accomplished in the digital domain using a digital demodulator (32).

14 Claims, 3 Drawing Sheets

WIRELESS POWERED COMMUNICATION DEVICE USING POWER SIGNAL SAMPLING AND METHOD

FIELD OF THE INVENTION

The present invention relates generally to wireless powered communication devices and more particularly to a wireless powered communication device using power signal sampling for data sampling.

BACKGROUND OF THE INVENTION

Smart cards, which look and feel much like ordinary credit cards, contain circuitry for communicating, processing and storing information. Smart cards have many applications, but primarily, smart cards are used for financial transactions. The smart card stores a monetary balance which is credited/debited with each transaction. Additional uses for smart cards are as identification tags for employees, etc.

To provide communication between the smart card and a card reader, smart cards have been adapted with metalized tabs on the card surface which provide a direct connection between the circuitry within the card and the card reader. With this arrangement to make a transaction, the card is inserted into a receptor slot of the card reader where reader probes contact the metalized tabs. The reader provides a controlled and filtered power supply and data signal to the smart card via the metalized tabs.

The advantage of providing the smart card with metalized tabs is that very clean, filtered and separated power and data signals may be communicated to the smart card. This ensures proper operation. However, there is a disadvantage in that the card must make contact with the card reader, i.e., the metalized tabs must contact the card reader probes. In an improved arrangement, the smart card is adapted to operate in a "contact-less" manner.

Contact-less smart cards have been proposed and implemented with success. The contact-less smart card is remotely powered and communicated with by the card reader. Typically, power to the smart card is supplied by a high frequency signal and a data carrier signal is supplied by another frequency, which is preferably divided directly from the power signal. With this arrangement, the user simply positions the smart card near the reader to perform a transaction. The card need only come within 10 or 15 centimeters (cm) of the card reader. Power and data signals are inductively coupled from the reader to the card using two tuned resonant circuits. The power coupling frequency is preferably unmodulated and spectrally pure so as not to electrically jam or interfere with any electronic equipment that operates on adjacent frequency bands. The data carrier frequency is a submultiple of the power coupling frequency and is modulated using a suitable modulation technique such as amplitude shift keying (ASK). The data carrier is coupled into the card using an inductor or coil in each of the card and the card reader. Again to avoid interference, the data carrier signal level is held to a very low level.

One problem with contact-less smart cards is recovering the data signal from the data carrier. Because of the relatively large value of the power signal as compared to the data signal there is a significant power signal component present on the data coil. This component of the power signal must be removed in order to accurately recover the data signal. Also, the rectification and regulation of the power signal to generate the power supply results in a substantial power signal frequency component on the power supplies, requiring a data carrier recovery circuit with good power supply rejection.

A prior proposed solution to this problem requires use of a high order filter which because of the proximity of the power and data signals in frequency requires many poles of filtering and a high filter gain for recovery of the data signal. In this approach, the data carrier signal is first filtered to remove the interfering power signal. Then, the data carrier signal is limited to facilitate detection of the data. In addition, this approach requires expensive precise analog components to implement the filtering and many stages of both filtering and gain to achieve the necessary signal rejection and gain. Furthermore, the number of components consume a considerable amount of power reducing the distance from the reader that the device may be effectively used. As a result, the proposed solution is not desirable for use in smart card devices.

Another proposed solution uses mixers to mix the input signal with a clock at the data carrier frequency. This mixed signal is then filtered and amplified to retrieve the data. This method provides improvement over the use of multi-pole filters and multiple stage gain by reducing the amount of filtering required. Still there remains a need for an efficient solution to the problem of accurately recovering the data signal in view of inherent power signal noise which is easily implemented in smart card technology.

DETAILED DESCRIPTION OF THE PREFERRED EMBODIMENTS

The present invention obviates the need for the costly high power filters of prior art devices by deriving a clock signal from the power signal, and then sampling the data signal with the derived sampling clock. The step of deriving a clock signal from the power signal causes the component of the power signal present on the data signal to be aliased to DC which is then easily rejected with a low order high pass or bandpass filter. Furthermore, the data signal may be amplified to a desired level suitable for amplitude discrimination by a simple comparator circuit with hysteresis. Demodulation of the data signal is easily accomplished in the digital domain.

The present invention is described in terms of a preferred embodiment suitable for implementation in a monolithic low power data recovery circuit for use in a wireless powered communication device. It will be readily appreciated that the present invention has application beyond the preferred embodiment herein described which should be taken as illustrative rather than limiting.

Figure 1:
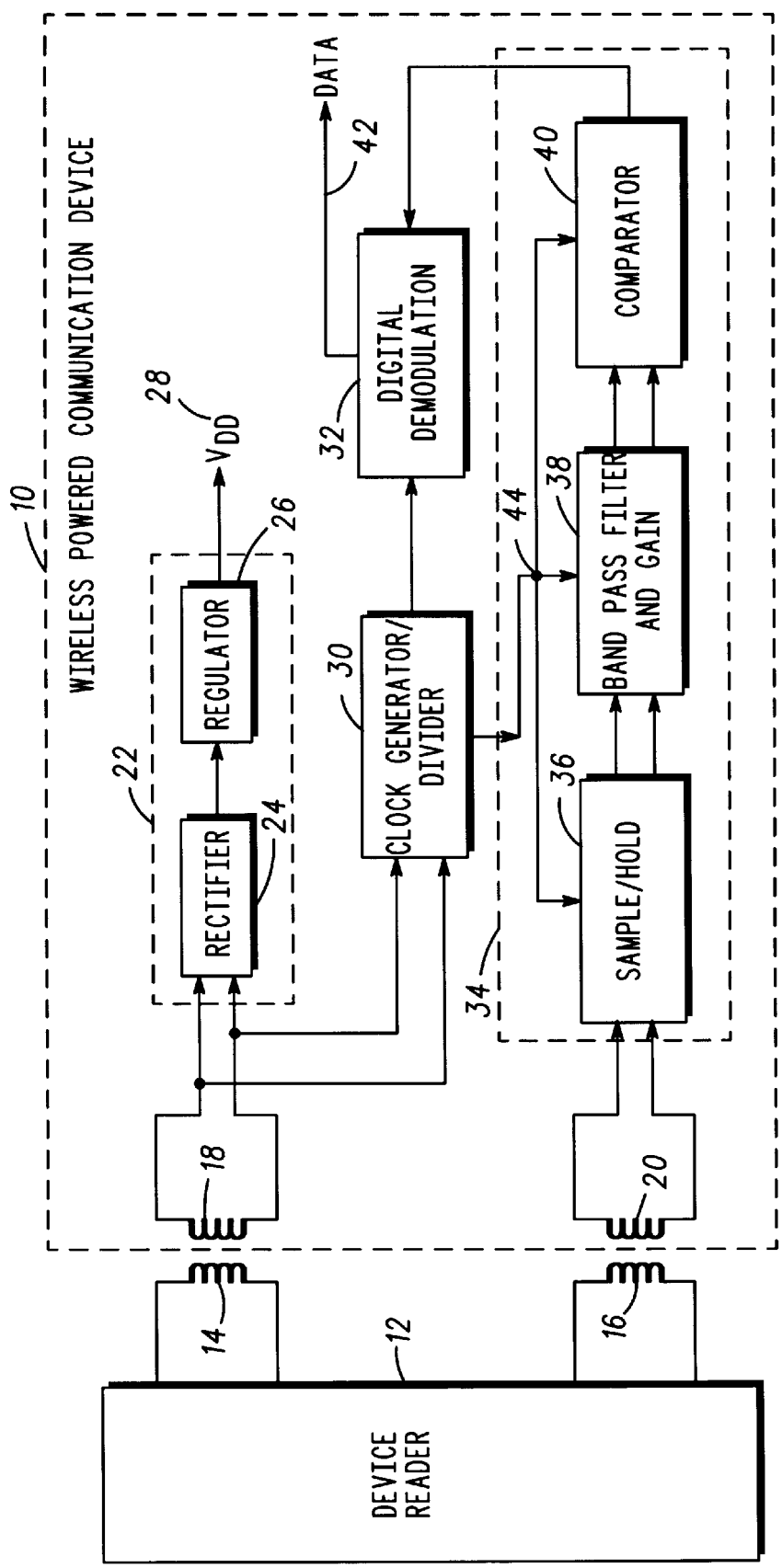
FIG. 1 is a block diagram representation of a wireless powered communication device and a wireless powered communication device reader in accordance with a preferred embodiment of the present invention.

Referring to FIG. 1 a wireless powered communication device 10 is shown in block diagram form and adjacent device reader 12. Device reader 12 is of conventional design and function and includes a power coil 14 and a data coil 16 for providing both a power carrier signal and a data carrier signal to device 10. Device 10 includes power and data coils, 18 and 20, respectively, for respectively receiving the power and data carrier signals. Device 10 further includes a power circuit 22 having a rectifier 24 and a voltage regulator 26 to provide a source of DC voltage 28 to device 10. Coupled to power coil 18 is a clock generation/divider circuit 30 which has a clock output to a digital demodulation circuit 32 and to data carrier recovery circuit 34. Clock circuit 30 is adapted to recover a clock signal from the power signal. Sampling clock 44 is preferably created by simply buffering the output of power coil 18 with an inverter. However, in some instances it may be advantageous to first divide the power coil output frequency, and then sample the data coil output with a divided form of the power signal. In this way, power consumption is further reduced.

Data recovery circuit 34 includes sampling circuit 36 coupled to filter and gain circuit 38 and comparator 40. Each of sampling circuit 36, filter 38 and comparator 40 are coupled to receive the clock output signal. The output of comparator 40 is coupled to digital demodulation circuit 32 which provides the original recovered data signal 42 output.

The power signal is generated within the reader and is inductively coupled to the device 10 by coil 18. The power signal on coil 18 is full wave rectified by rectifier 24 and then regulated by regulator 26 to the supply voltage 28. As described, a sampling clock frequency 44 is generated by clock circuit 30 from the power signal received at coil 18 and is communicated to both sampling circuit 36, filter 38 and comparator 40. Sampling circuit 36 samples the data signal at the frequency of the power signal with clock frequency 44. By sampling the data signal at a rate derived from the power signal, the power signal component seen on the data signal received at data coil 20 is aliased to DC and thereafter is easily rejected with filter 38. Filter 38 is therefore preferably a low order high pass filter or band pass filter.

Figure 2:
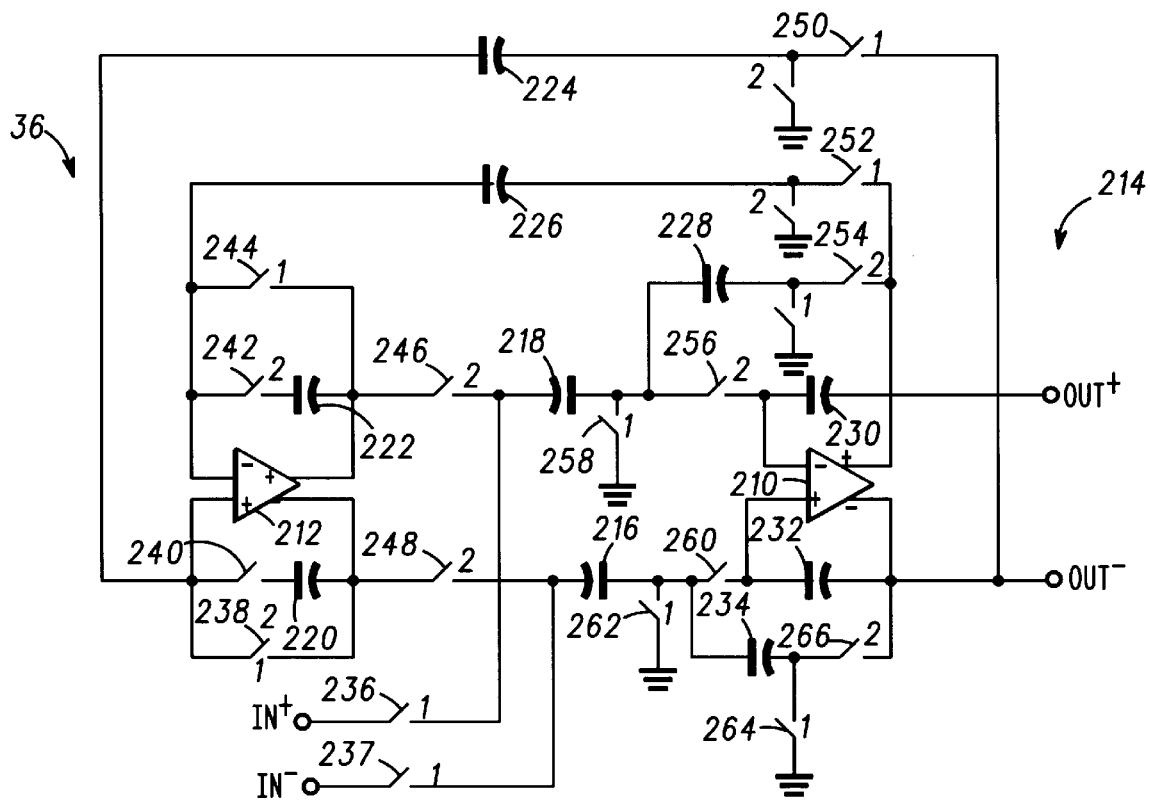
FIG. 2 is circuit diagram of a sampling circuit in accordance with a preferred embodiment of the present invention.
Figure 3:
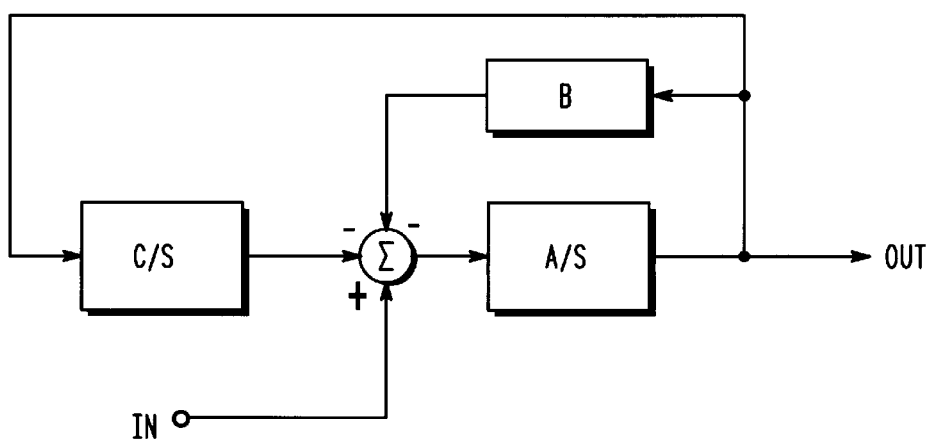
FIG. 3 is a transfer function representation of the sampling circuit illustrated in FIG. 2.

A preferred embodiment of the sampling circuit 36 is shown in FIG. 2. The circuit includes amplifiers 210 and 212 which are interconnected with the switched capacitor network 214 to create a biquadratic bandpass response. Switched capacitor network 214 includes capacitors 216–236 and switches 238–266. The equivalent s-domain transfer function for sampling circuit 36 is shown in block form in FIG. 3 and is:

$$Out = In\left[\frac{sA}{s^2 + BAs + CA}\right]$$

The z-domain transfer function for the circuit shown in FIG. 2 is:

$$T(z) = \frac{(-DJ + DJz^{-1})}{[D(F+B) + (JC - DF - 2DB)z^{-1} + DBz^{-2}]}$$

With the preferred component values, the transfer function is:

$$T(z) = \left(\frac{-1.6487 + 1.6487z^{-1}}{1 + 7.66838z^2}\right)$$

Sampling circuit 36 provides virtually complete rejection of the power signal component, as well as amplification of the desired data signal. The circuit also provides a transmission zero at DC and produces an output voltage with a zero DC component. A fully differential signal processing circuit is used to maximize the circuits power supply rejection and substantially reject any residual component of the power signal which may appear at regulator 26.

Figure 4:
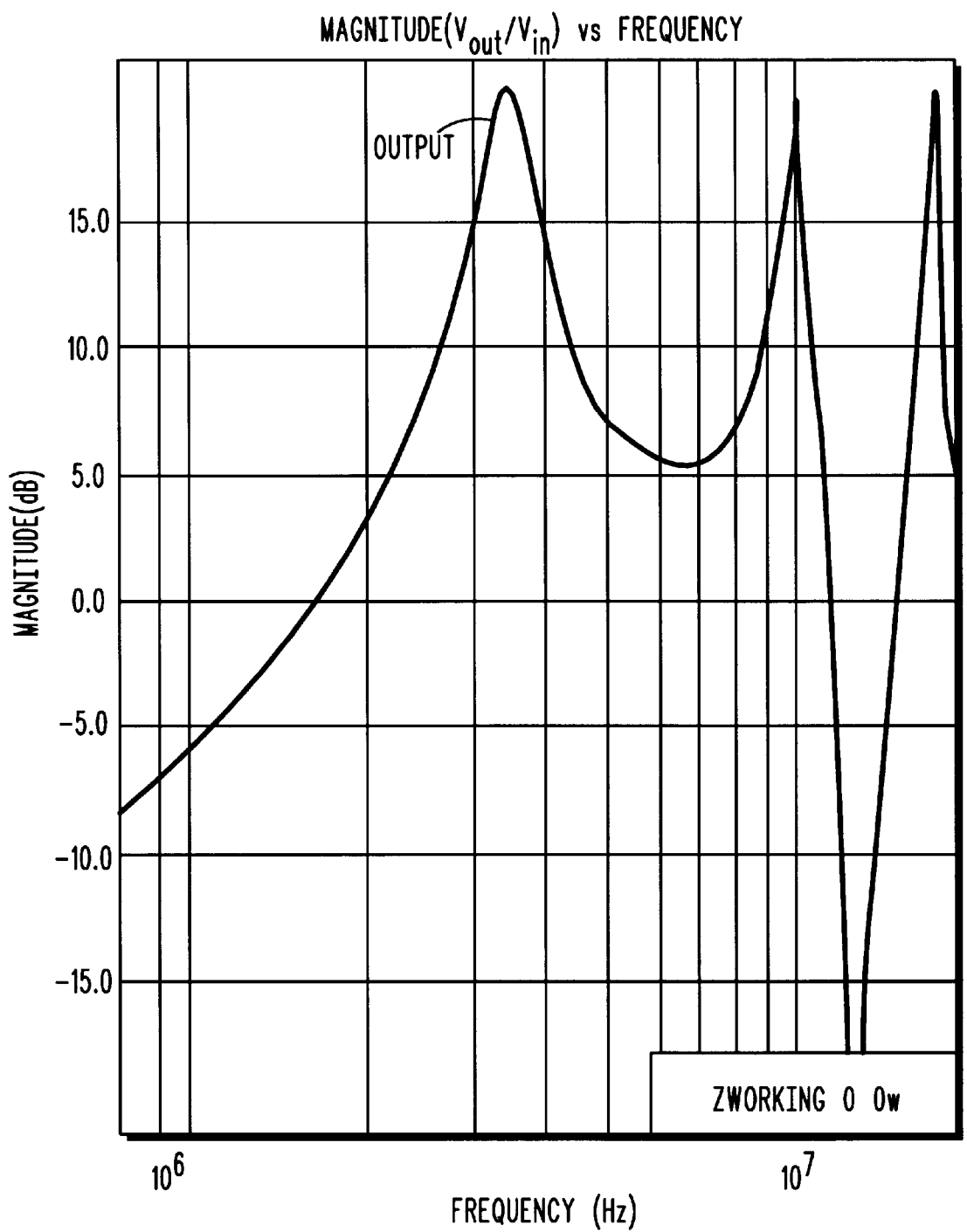
FIG. 4 is a chart illustrating the frequency response characteristic of the sampling circuit of FIG. 2.

The switched capacitor component values are chosen to produce a second order bandpass filter response centered at the carrier frequency. The 3 decibel (db) bandwidth is set equal to four times the data rate to produce a Q of 6 and provide approximately 20 db of amplification of the data carrier. The magnitude response of the circuit is shown in FIG. 4. The bandpass topology is structured to both maximize the gain applied to the desired data signal and concurrently minimize or zero the DC level at the output. Thus the bandpass filter structure provides an ability to provide gain more efficiently than using a high pass response. Bandpass response is also preferred as it rejects high frequency noise.

With further reference to FIG. 2, the signal received at the data coil is first sampled onto input capacitors 216 and 218 during one phase of the sampling clock. The switches shown in FIG. 2 represent toggle-switches driven by a two-phase clock having a phase one (1) and a phase two (2). In a preferred implementation metal-oxide field effect transistor (MOSFET) switches would be used as is well known in the art. Since the sampling clock signal 44 is derived from the power signal, the sampling clock is then synchronous with the power signal component appearing on the data signal. Consequently, each sample is taken during the same phase of each cycle of the power signal component. As a result, the input power signal component is converted to a constant DC level which is filtered by filter 38. For many applications the performance of sampling circuit 36 is independent of the phase relationship between the sampling clock and the power signal component which appears at the data coil output. However, to maximize performance for very high speed applications, one can optionally include a phase adjust circuit to adjust the phase of the sampling clock so that the samples are acquired when the slope of the power signal component is a minimum. Moreover, one may align the phase of the sampling clock so that samples are acquired when the power signal disturbance on the voltage 28 is at a minimum. Note that FIG. 2 shows a configuration to sample the data coil output without placing amplifiers in the input sampling path when the signal is sampled at the data coil output. This advantageously reduces the bandwidth required by the amplifiers used in the circuit.

After the data signal has been sampled, the sampled data signal is then transferred to integrating amplifier 210 for amplification. As can be seen, amplifier 210 is configured to produce a zero DC component at the amplified output. A zero DC output component is produced by coupling the output of amplifier 210 into autozeroed integrating amplifier 212. An autozeroed arrangement for an integrating amplifier is shown and described in commonly assigned U.S. Pat. No. 4,802,236, issued Jan. 31, 1989, the disclosure of which is hereby expressly incorporated herein by reference. During steady state operation, the average DC charge coupled into the input of integrating amplifier 212 must equal zero. Since the only DC input to integrating amplifier 212 is the output of amplifier 210, the average DC output level of amplifier 210 must also equal zero as well.

Following signal conditioning, the data signal, which is ASK modulated, i.e., the carrier amplitude is switched between an on or an off value based on the state of the binary data, is amplitude discriminated by comparator 40. In a preferred implementation, a binary one is represented by presence of the carrier signal while a binary zero is represented by the absence of the carrier signal. Comparator 40 is designed to have a predetermined level of hysteresis set between the noise level and the carrier amplitude level. Comparator 40 output will toggle at the data carrier rate when a modulated binary one is received and will cease to toggle when a binary zero is received. This resulting signal is then easily digitally demodulated in digital demodulator 32, as is known in the art, for recovering the original source data stream. It may also be preferable to make the hysteresis level programmable to provide automatic gain control further increasing the range over which device 10 operates. It should be understood that while ASK modulation has been discussed, the present invention has application to any type of modulation.

While a preferred embodiment of the invention has been described in the above detailed description and illustrated in the accompanying drawings, the invention is not limited thereto but only by the scope and spirit of the appended claims.

We claim:

1. In a wireless powered communication device wherein a receiver station provides a power signal at a power frequency and an amplitude-modulated data signal at a data carrier frequency to the wireless powered communication device, the wireless powered communication device being adapted to receive the power signal and the amplitude-modulated data signal, a method for recovering data from the amplitude-modulated data signal comprising the steps of:

deriving a sampling clock frequency from the power signal;

sampling the amplitude-modulated data signal at the sampling clock frequency to provide a sampled signal, the sampling clock frequency being derived from the power signal;

filtering the sampled signal to provide a filtered signal; and demodulating the filtered signal to provide an output data signal.

2. The method of claim 1 wherein the step of sampling the amplitude-modulated data signal at the sampling clock frequency includes a step of:

generating a sampling clock signal having the sampling clock frequency from the power frequency.

3. The method of claim 2 wherein the step of sampling the amplitude-modulated data signal includes a step of:

communicating the amplitude-modulated data signal to a sampling circuit clocked at the sampling clock frequency.

4. The method of claim 3 wherein the step of demodulating the filtered signal includes a step of:

amplitude discriminating the filtered signal to provide a discriminated signal and converting the discriminated signal to a digital output.

5. The method of claim 4 further including a step of phase aligning the sampling clock signal and the power signal.

6. The method of claim 5 wherein the step of filtering comprises one of high pass filtering and band pass filtering.

7. The method of claim 5 wherein the step of filtering further includes a step of increasing a gain of the filtered signal.

8. A wireless powered communication apparatus wherein a receiver station provides a power signal at a power frequency and an amplitude-modulated data signal at a data carrier frequency to the wireless powered communication apparatus, the wireless powered communication apparatus being adapted to receive the power signal and the amplitude-modulated data signal, the wireless powered communication apparatus including recovering means for recovering data from the amplitude-modulated data signal, the recovering means comprising:

deriving means for deriving a sampling clock frequency from the power signal;

sampling means for sampling the amplitude-modulated data signal at the sampling clock frequency to provide a sampled signal, the sampling clock frequency being derived from the power signal;

filtering means for filtering the sampled signal to provide a filtered signal; and demodulating means for demodulating the filtered signal to provide an output data signal.

9. The wireless powered communication apparatus of claim 8 wherein the sampling means comprises generating means for generating a sampling clock signal having the sampling clock frequency from the power frequency.

10. The wireless powered communication apparatus of claim 9 wherein the sampling means further includes communicating means for communicating the amplitude-modulated data signal to a sampling circuit clocked at the sampling clock frequency.

11. The wireless powered communication apparatus of claim 10 wherein the demodulating means includes discriminating means for amplitude discriminating the filtered signal to provide a discriminated signal and converting means for converting the discriminated signal to a digital output.

12. The wireless powered communication apparatus of claim 11 further including phase aligning means for phase aligning the sampling clock signal and the power signal.

13. The wireless powered communication apparatus of claim 12 wherein the filtering means comprises one of means for high pass filtering and means for band pass filtering.

14. The wireless powered communication apparatus of claim 12 wherein the filtering means further includes means for increasing a gain of the filtered signal.

* * * * *